Dec. 15, 1936.  S. J. JANEKO  2,064,756

PISTON BLOCK

Filed Oct. 23, 1935

Inventor

STANLEY J. JANEKO

By Ralph Burch

Attorney

Patented Dec. 15, 1936

2,064,756

UNITED STATES PATENT OFFICE 2,064,756

PISTON BLOCK

Stanley J. Janeko, Detroit, Mich.

Application October 23, 1935, Serial No. 46,429

3 Claims. (Cl. 309—5)

My invention relates to improvements in pistons and cylinders for engines, pumps and the like.

It is an object of the invention to provide a piston and cylinder having anti-friction bearings between the walls of the piston and walls of the cylinder which will permit free sliding movement of the piston without danger of scoring the walls of the cylinder.

A further object of the invention is to provide a device of the above-mentioned character which is simple and durable in construction, reliable and efficient in operation and inexpensive to manufacture.

Other objects and advantages of the invention will be apparent during the course of the following description.

In the accompanying drawing, forming a part of this specification and in which like numerals are employed to designate like parts throughout the same.

Figure 1:
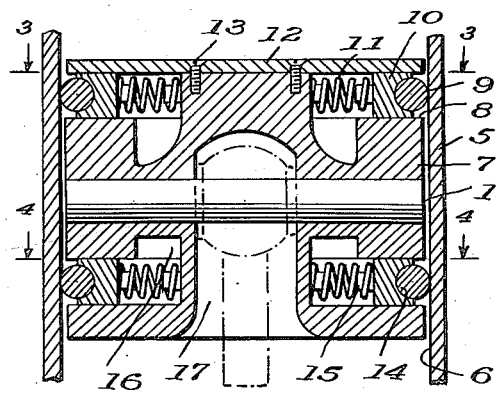
Figure 2:
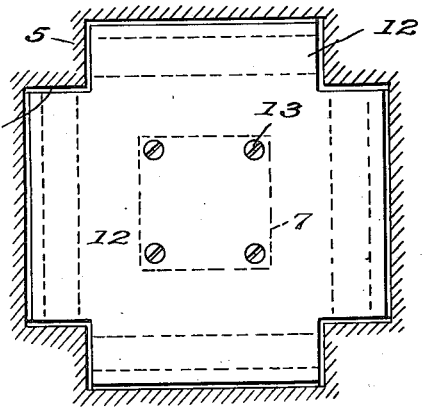
Figure 3:
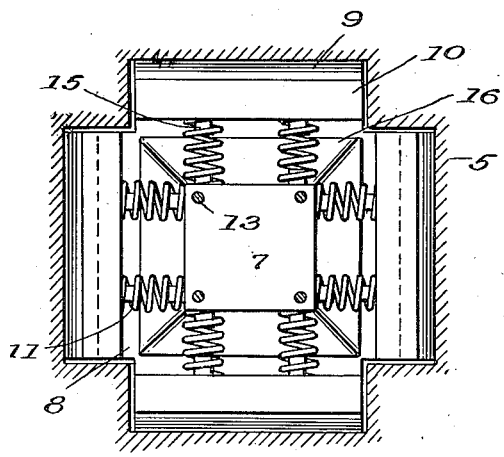
Figure 4:
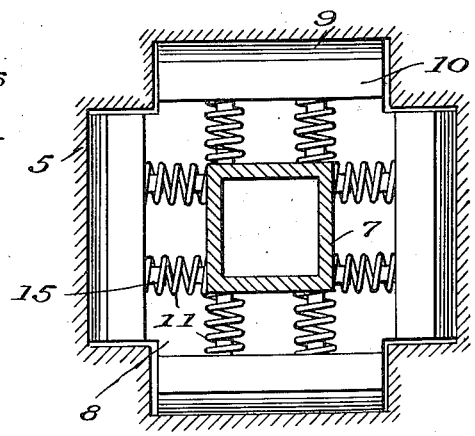

Fig. 1 is a vertical sectional view of a piston and cylinder constructed in accordance with my invention, Fig. 2 is a top plan view of the same, Fig. 3 is a horizontal sectional view taken on line 3—3 of Fig. 1, and Fig. 4 is a horizontal sectional view taken on line 4—4 of Fig. 1.

In the drawing, wherein for the purpose of illustration, I have shown a preferred embodiment of my invention, the numeral 5 denotes a cylinder block having a longitudinal bore 6 of substantially cross-shape in cross section. A piston 7 of corresponding shape to the bore 6 is slidably mounted in the bore and formed in each wall of the piston in vertically spaced relation are transverse pockets 8 for reception of roller bearings 9 which are seated in journal blocks 10 slidably disposed within the pockets and coil springs 11 disposed between the rear wall of the pocket and journal block press the roller bearings 9 into contact with the walls of the cylinder. The pockets 8 extend the full width of the piston wall, the uppermost pockets being covered by a removable cover plate 12 which is secured to the piston by screws 13. The journal blocks 10 are provided in their outer face with an arcuate groove 14 forming a seat for the roller bearings. The inner face of the journal block and rear wall of the pockets have opposed pins 15 projecting therefrom which retain the coil springs 11 in position, there being two coil springs for each journal block. The rear ends of the pockets have depressions 16 for retaining lubricant within the pockets to lubricate the journal blocks and roller bearings. The bottom of the piston is provided with a central depression 17 to receive the end of a connecting rod which is connected to the piston by a wrist pin 18.

In operation, the tension of the springs 11 forces the roller bearings 9 beyond the walls of the piston and into contact with the walls of the cylinder, thus holding the walls of the piston in anti-friction relation to the walls of the cylinder, permitting free sliding movement of the piston without danger of scoring the walls of the cylinder.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. In combination with a cylinder having angularly disposed walls, of a piston operating in the cylinder having pockets in its side wall, roller bearings disposed in the pockets of said piston and tension means for moving said bearings into engagement with the walls of the cylinder.

2. In combination with a cylinder having angularly disposed walls, of a piston operating in the cylinder having pockets in its side walls, roller bearings disposed in the pockets of said piston, journal blocks disposed behind said bearings in said pockets, and tension means for moving said bearings into engagement with the walls of the cylinder.

3. In combination with a cylinder having angularly disposed walls, of a piston operating in the cylinder having transverse pockets in its side walls, roller bearings disposed in said pockets, journal blocks disposed behind said bearings in said pockets, and coil springs disposed between the rear wall of said pockets and said bearing blocks for urging said bearings into engagement with the walls of the cylinder.

STANLEY J. JANEKO.